United States Patent [19]
Hoq et al.

[11] Patent Number: 5,948,380
[45] Date of Patent: Sep. 7, 1999

[54] PREPARATION OF NON-ALKALI CHLORATES

[76] Inventors: M. Fazlul Hoq, 1367 Boswall Dr., Worthington, Ohio 43085; Mohammed N.I. Khan, 423 19th St. West, Clear Lake, Iowa 50428

[21] Appl. No.: 09/039,832

[22] Filed: Mar. 16, 1998

Related U.S. Application Data

[60] Provisional application No. 60/041,144, Mar. 17, 1997.

[51] Int. Cl.$^6$ .................................................. C01B 11/14

[52] U.S. Cl. .................................................. 423/475

[58] Field of Search .................. 423/475, 419.1, 423/430

[56] References Cited

U.S. PATENT DOCUMENTS

| | | | |
|---|---|---|---|
| 1,338,234 | 4/1920 | McIlhiney | 423/475 |
| 3,690,845 | 9/1972 | Grotheer | 423/475 |
| 5,378,447 | 1/1995 | Jackson et al. | 423/475 |

*Primary Examiner*—Ngoc-Yen Nguyen
*Attorney, Agent, or Firm*—Zarley, McKee, Thomte, Voorhees & Sease

[57] ABSTRACT

A method for synthesizing non-alkali chlorates is described. The method includes the steps of: 1) reacting a non-alkali metal salt with sodium bicarbonate to form an insoluble metal carbonate or metal hydroxide precipitate; and 2) combining the precipitate with an aqueous solution of ammonium chlorate. The method is much simpler and less expensive to perform than prior art methods.

15 Claims, 2 Drawing Sheets

PREPARATION OF NON-ALKALI CHLORATES

CROSS-REFERENCE TO RELATED APPLICATION

This application is a continuation-in-part of copending, provisional application Ser. No. 60/041,144, filed Mar. 17, 1997, the disclosure of which is hereby incorporated by reference.

FIELD OF THE INVENTION

This invention relates to the production of industrial chemicals. More specifically, the invention describes the production of chlorate salts of ammonium, alkaline earth metals and other non-alkali metals. These chlorate salts may be used in the production of industrially important chemicals such as chlorine dioxide and chloric acid.

BACKGROUND OF THE INVENTION

The preparation of metal chlorate by reaction of metal oxides, metal hydroxides and metal carbonates with chloric acid is known. However, the known method for preparation of chloric acid by reaction of barium chlorate and sulfuric acid is very expensive. The preparation of a non-alkali metal chlorate by precipitation during double decomposition of sodium chlorate and a non-alkali metal chloride in aqueous solution is only limited to barium.

There is therefore a need in the art for a method of preparing chloric acid which is relatively inexpensive in comparison to known methods.

It is a primary objective of the present invention to provide a relatively simple and inexpensive method of making any non-alkali metal chlorate by reaction with sodium chlorate.

The method and means of accomplishing this primary objective well as others will become apparent from the detailed description of the invention which follows hereafter.

SUMMARY OF THE INVENTION

The invention describes a method for producing chlorate salts of ammonium, alkaline earth metals, and other non-alkali metals. The chlorates are synthesized through the reaction of a metal carbonate, hydroxide, or other metal salt which is more soluble than the corresponding carbonate or hydroxide with sodium chlorate in the presence of ammonia and carbon dioxide. The method is simple and much less expensive than the previously known methods for synthesizing chlorate salts.

DETAILED DESCRIPTION OF THE PREFERRED EMBODIMENT

Figure 1:
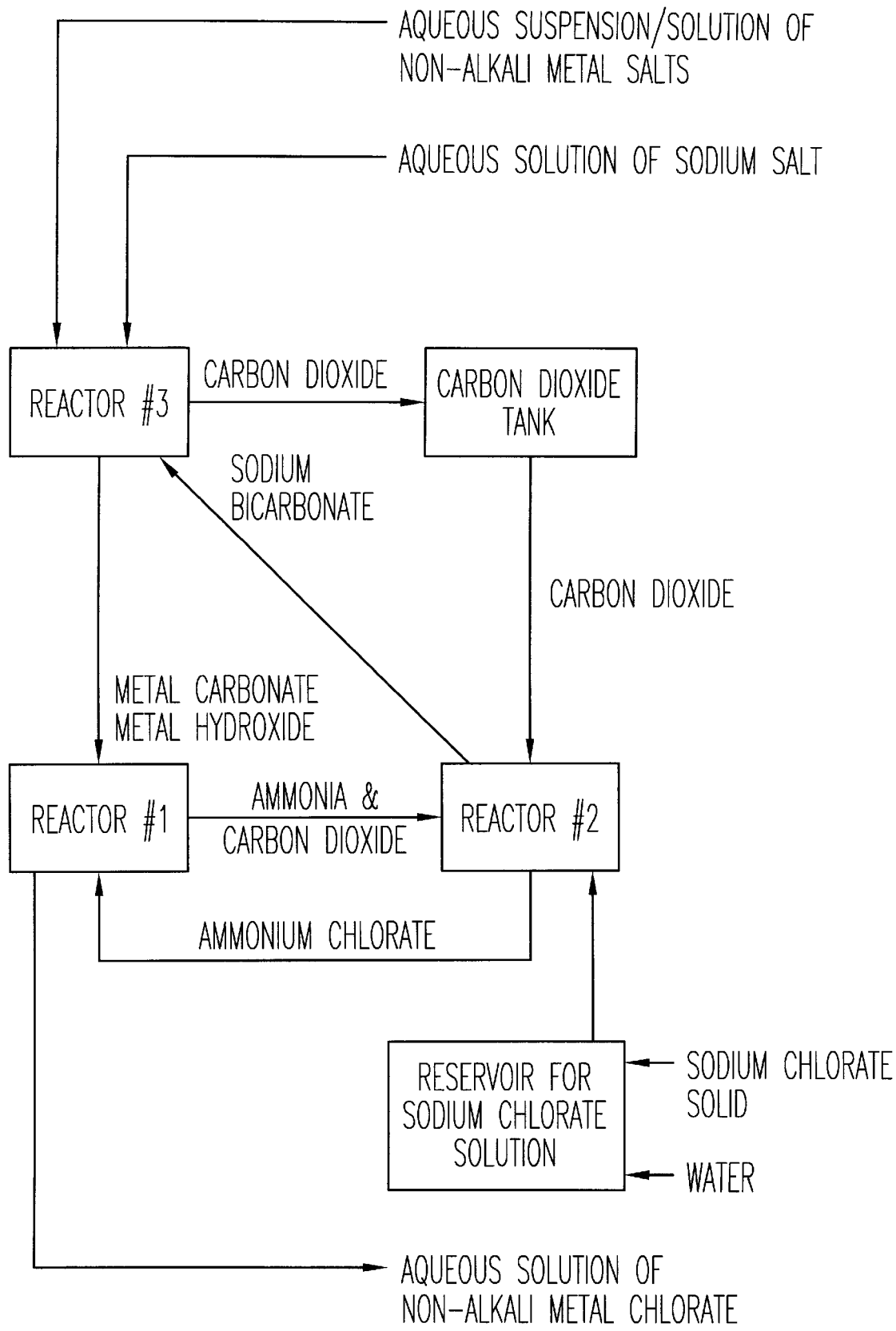
FIG. 1 is a schematic drawing of an embodiment of the present invention for the synthesis of non-alkali metal chlorates.

The present invention relates to a new method for synthesizing chlorate salts of ammonium, alkaline earth metals, and other non-alkali metals. These chlorate salts are important industrially in the production of chemicals such as chlorine dioxide and chloric acid.

The first step in the basic method is to react a metal salt with an aqueous solution, or slurry of sodium bicarbonate or sodium carbonate. The metal salts include: I) the carbonates and hydroxides of any metal; and II) any salts of any metals which are more soluble than their corresponding carbonates and hydroxides. With respect to Group I, the preferred salt is barium carbonate. With respect to Group II, the preferred salts are the sulfates of calcium, strontium, copper, silver, cobalt, nickel, iron, manganese, and rare earth metals as well as the chlorides of barium, calcium, strontium, copper, silver, cobalt, nickel, iron, manganese, and the rare earth metals.

The reaction between the metal salt and sodium bicarbonate should take place at a temperature of between 10–100° C., with a preferred range of between 35–100° C. and a most preferred range of between 35–85° C. The reactants are preferably stirred during the reaction process. The metal salt and sodium bicarbonate should be present in a ratio of from 1:2 to 2:2.

Examples of reactions which take place between the metal salt and sodium bicarbonate are as follows:

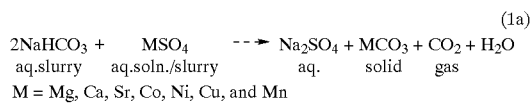
(1a)
$2NaHCO_3 + MSO_4 \dashrightarrow Na_2SO_4 + MCO_3 + CO_2 + H_2O$
aq.slurry   aq.soln./slurry        aq.    solid   gas
M = Mg, Ca, Sr, Co, Ni, Cu, and Mn

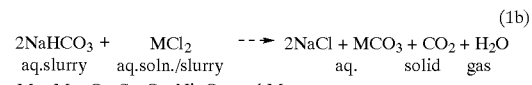
(1b)
$2NaHCO_3 + MCl_2 \dashrightarrow 2NaCl + MCO_3 + CO_2 + H_2O$
aq.slurry   aq.soln./slurry        aq.    solid   gas
M = Mg, Ca, Sr, Co, Ni, Cu, and Mn

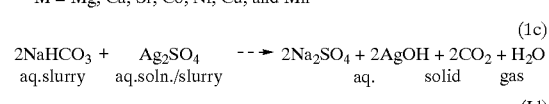
(1c)
$2NaHCO_3 + Ag_2SO_4 \dashrightarrow 2Na_2SO_4 + 2AgOH + 2CO_2 + H_2O$
aq.slurry   aq.soln./slurry              aq.       solid     gas

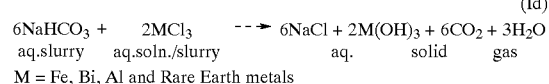
(1d)
$6NaHCO_3 + 2MCl_3 \dashrightarrow 6NaCl + 2M(OH)_3 + 6CO_2 + 3H_2O$
aq.slurry   aq.soln./slurry        aq.       solid       gas
M = Fe, Bi, Al and Rare Earth metals The insoluble carbonates and hydroxides of the desired metals are then precipitated from the reaction mixture and further processed.

The next step in the process is to combine the insoluble metal carbonate or hydroxide obtained above with an aqueous solution of ammonium chloride. The concentration of ammonium chloride may range from 0.5 molar to saturation in aqueous solution. The ratio of metal carbonate or hydroxide to ammonium chloride must be equal to or greater than the ratios as shown in equations 2a, 2b and 2c. The presence of excess metal carbonate or hydroxide in the reaction mixture is preferred. Examples of this reaction are as follows:

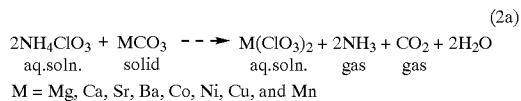
(2a)
$2NH_4ClO_3 + MCO_3 \dashrightarrow M(ClO_3)_2 + 2NH_3 + CO_2 + 2H_2O$
aq.soln.      solid           aq.soln.    gas    gas
M = Mg, Ca, Sr, Ba, Co, Ni, Cu, and Mn

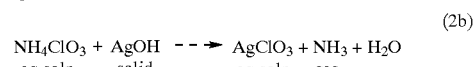
(2b)
$NH_4ClO_3 + AgOH \dashrightarrow AgClO_3 + NH_3 + H_2O$
aq.soln.    solid         aq.soln.   gas

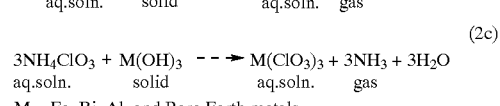
(2c)
$3NH_4ClO_3 + M(OH)_3 \dashrightarrow M(ClO_3)_3 + 3NH_3 + 3H_2O$
aq.soln.      solid           aq.soln.      gas
M = Fe, Bi, Al, and Rare Earth metals The reaction of the metal hydroxide/carbonate precipitate with ammonium chlorate is performed at subatmospheric pressures at a temperature range of from 35–105° C., with a preferred temperature range of 55–95° C. The removal of the last traces of ammonia by a flow of carbon dioxide gas through the reaction mixture is preferred.

Any source of ammonium chlorate is appropriate for use in the reactions 2a–2c. However, a preferred source for the ammonium chlorate is provided by the reaction of carbon dioxide, ammonia, and sodium chlorate in aqueous solution to form a precipitate of sodium bicarbonate and an aqueous ammonium chlorate as set forth in reaction 3:

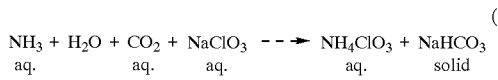

(3)
$NH_3 + H_2O + CO_2 + NaClO_3 \dashrightarrow NH_4ClO_3 + NaHCO_3$
aq.    aq.    aq.    aq.    solid The reaction of ammonia, carbon dioxide, and sodium chlorate can be performed at carbon dioxide pressures of 1–700 atmospheres and a temperature range of between about −2° C. to 40° C. The molar ratio of ammonia and sodium chlorate can be in the range of about 1:1. The molar ratio of ammonia, carbon dioxide, and sodium chlorate in the reaction can be about 1:1:1 although an excess of dissolved carbon dioxide in the reaction mixture is preferred. The solid sodium bicarbonate formed can serve as a reactant in reactions 1a–1d.

An alternative method of preparing ammonium chlorate is by absorbing the vapors of ammonium bicarbonate in a 2 molar to saturated solution of sodium chlorate.

The present method of synthesizing chlorate salts of non-alkali metals offers several advantages over previous methods. First, the method is much less expensive to perform than the previously known method of preparing chloric acid through the reaction of barium chlorate and sulfuric acid. Further, unlike the previous method of preparing a non-alkali metal chlorate by precipitation during double decomposition of sodium chlorate and a non-alkali metal chloride in aqueous solution, the present method is not merely limited to barium.

The non-alkali metal chlorates produced using the method of the instant invention have a wide variety of uses. For example, the chlorate salts are used in the production of many industrially important chemicals such as chlorine dioxide and chloric acid. Chlorine dioxide is used for various bleaching purposes, such as bleaching wood pulp, fats, oils, and flour, bleaching and removing tastes and odors from water supplies and in swimming pools. Chloric acid is used in producing chlorine dioxide. Some metal chlorates are used for making signal flares and fireworks.

The following examples are offered to illustrate but not limit the invention. Thus, they are presented with the understanding that various formulation modifications as well as method of delivery modifications may be made and still be within the spirit of the invention.

EXAMPLE 1

Synthesis of Non-Alkali Metal Chlorates

Figure 2:
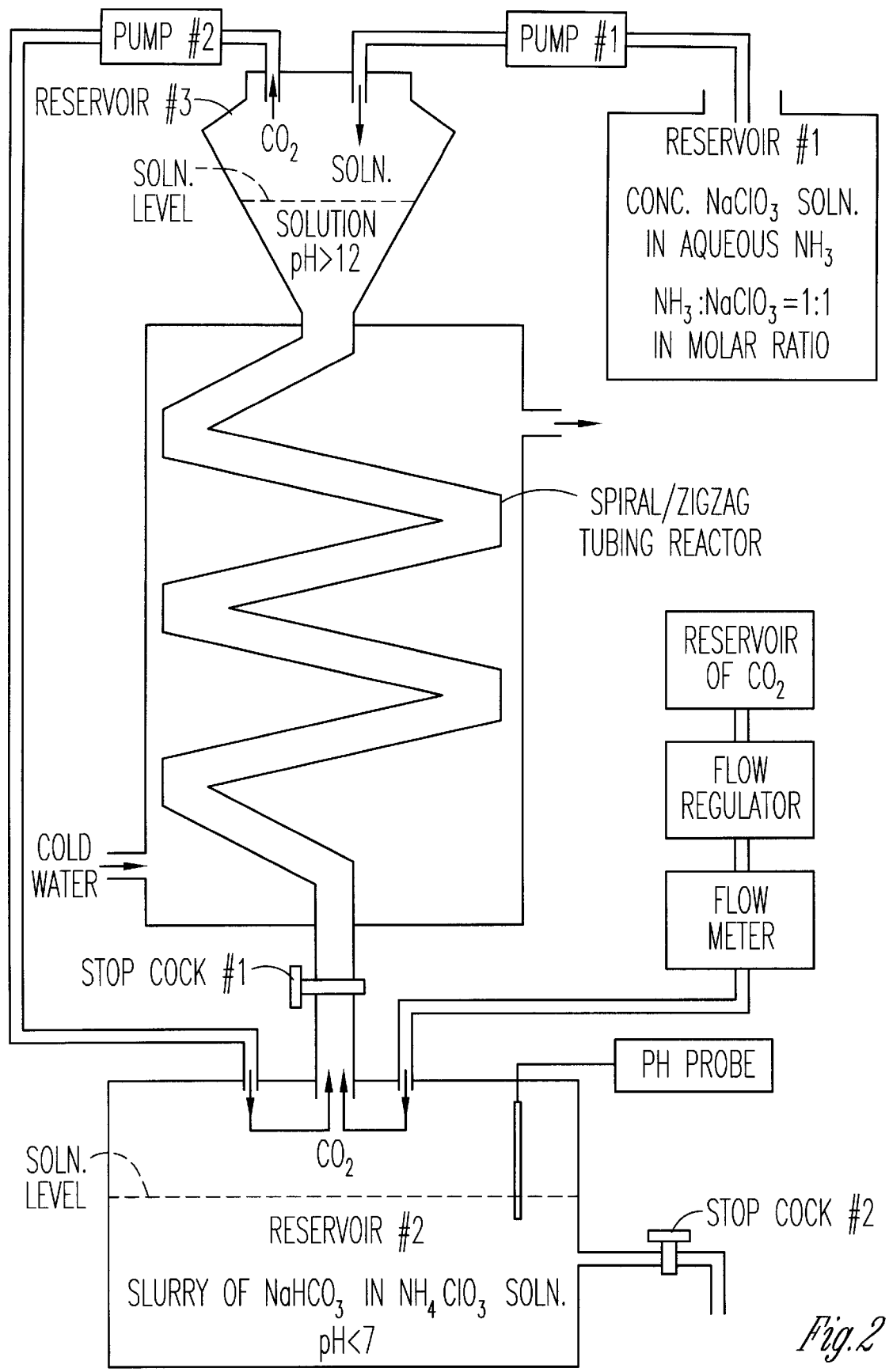
FIG. 2 is a schematic drawing of an embodiment of the present invention for ammonium chlorate preparation using a flow reactor.

FIG. 1 sets forth a schematic method for generating non-alkali metal chlorates. As shown in FIG. 2, ammonia and carbon dioxide gases generated by reaction 2a, or, ammonia generated by reaction 2b and reaction 2c in the temperature range of 35° C. to 105° C. in the REACTOR#1 are absorbed in a concentrated (2M to saturated) solution of sodium chlorate at −2° C. to 40° C. in REACTOR#2.

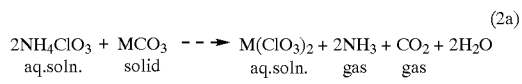

(2a)
$2NH_4ClO_3 + MCO_3 \dashrightarrow M(ClO_3)_2 + 2NH_3 + CO_2 + 2H_2O$
aq.soln.    solid    aq.soln.    gas    gas M = Mg, Ca, Sr, Ba, Co, Ni, Cu, and Mn

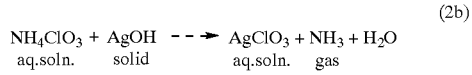

(2b)
$NH_4ClO_3 + AgOH \dashrightarrow AgClO_3 + NH_3 + H_2O$
aq.soln.    solid    aq.soln.    gas

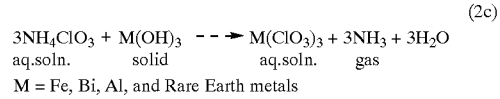

(2c)
$3NH_4ClO_3 + M(OH)_3 \dashrightarrow M(ClO_3)_3 + 3NH_3 + 3H_2O$
aq.soln.    solid    aq.soln.    gas M = Fe, Bi, Al, and Rare Earth metals A fast completion of reaction 2 is achieved by removing last traces of ammonia by a flow of carbon dioxide gas through the reaction mixture from the CARBON DIOXIDE TANK 4.

In REACTOR#2, carbon dioxide, ammonia and sodium chlorate react in aqueous solution, precipitating out sodium bicarbonate and generating aqueous ammonium chlorate as shown in reaction 3:

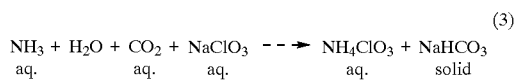

(3)
$NH_3 + H_2O + CO_2 + NaClO_3 \dashrightarrow NH_4ClO_3 + NaHCO_3$
aq.    aq.    aq.    aq.    solid The solid sodium bicarbonate serves as a feed chemical for REACTOR#3. The concentrated aqueous ammonium chlorate generated in REACTOR#2 from reaction 3 serves as feed chemical for REACTOR#1.

Solid sodium bicarbonate obtained from REACTOR#2 and a slurry/solution of the desired metal salt are fed into REACTOR#3 which is operated in the temperature range of 35–105° C., and preferably 45° C. to 95° C. REACTOR#3 is a container with heating and highly efficient stirring systems for carrying out metathesis reactions like 1a–1d whereby relatively insoluble carbonates and hydroxides of desired metals are precipitated, soluble sodium salts formed in the process go into solution, and a pump efficiently transfers the gaseous product carbon dioxide into the CARBON DIOXIDE TANK.

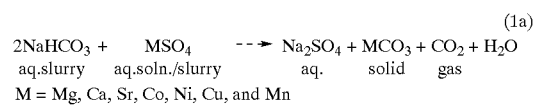

(1a)
$2NaHCO_3 + MSO_4 \dashrightarrow Na_2SO_4 + MCO_3 + CO_2 + H_2O$
aq.slurry    aq.soln./slurry    aq.    solid    gas M = Mg, Ca, Sr, Co, Ni, Cu, and Mn

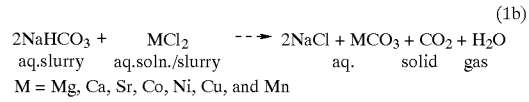

(1b)
$2NaHCO_3 + MCl_2 \dashrightarrow 2NaCl + MCO_3 + CO_2 + H_2O$
aq.slurry    aq.soln./slurry    aq.    solid    gas M = Mg, Ca, Sr, Co, Ni, Cu, and Mn

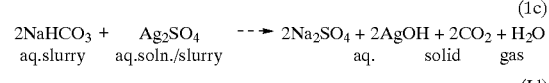

(1c)
$2NaHCO_3 + Ag_2SO_4 \dashrightarrow 2Na_2SO_4 + 2AgOH + 2CO_2 + H_2O$
aq.slurry    aq.soln./slurry    aq.    solid    gas

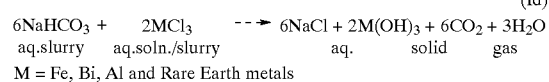

(1d)
$6NaHCO_3 + 2MCl_3 \dashrightarrow 6NaCl + 2M(OH)_3 + 6CO_2 + 3H_2O$
aq.slurry    aq.soln./slurry    aq.    solid    gas M = Fe, Bi, Al and Rare Earth metals Once reactions 1a–1d are complete, the aqueous suspension is filtered. The residue of metal carbonate/hydroxide is then fed into REACTOR#1.

EXAMPLE 2

Synthesis of Ammonium Chlorate in a Flow Reactor

FIG. 2 illustrates a flow-reactor for ammonium chlorate preparation. A water-jacketed spiral or zigzag metal tubing is attached to Reservoir #3 at the upper end and Reservoir #2 at the lower end. The spiral/zigzag tubing may be substituted by a commercial gas absorption tower capable of handling aqueous slurry. Pump #1 feeds Reservoir #3 with ammoniacal sodium chlorate solution stored in Reservoir #1. The chilled water flowing through jacket keeps the temperature of the reaction mixture in the tubing at 10 to 35° C. The opening of the stop cock #1 and the feeding rate of ammoniacal sodium chlorate solution are adjusted so that the spiral/zigzag tubing and about half of Reservoir #3 remain filled with solution. The ammoniacal sodium chlorate solution has a concentration of 2 molar to saturation with respect to sodium chlorate and is a mixture of ammonia and sodium chlorate in a 1:1 molar ratio, or a mixture of ammonium carbonate and sodium chlorate in a 1:2 molar ratio. $CO_2$ gas is fed into Reservoir #2. $CO_2$ gas passes as bubbles through ammoniacal sodium chlorate solution flowing downwards through the spiral/zigzag tubing.

Any residual $CO_2$ gas that survived reaction 1A and 1B during its journey through the ammoniacal solution inside the spiral tubing and accumulated in the Reservoir #3 is pumped by Pump #2 back into Reservoir #2.

The desired saturation of the solution with $CO_2$ and pH lowering of the solution from pH>12 in Reservoir #3 to pH<7 occurs in Reservoir #2. A pH probe to measure the pH of Reservoir #2 solution is employed. The final product, a slurry of $NaHCO_3$ in $NH_4ClO_3$ solution, is accumulated in Reservoir #2.

EXAMPLE 3

Preparation of Ammonium Chlorate by Batch Process

Method 1: Ammonium chlorate is made in a pressure-reactor by adding carbon dioxide under a pressure of 1 to 700 atmospheres to saturate a 2 molar to saturated solution of sodium chlorate in aqueous ammonia at −2° C. to 40° C. wherein the molar ratio of ammonia and sodium chlorate= 1:1.

Method 2: Ammonium chlorate is made in a pressure-reactor by adding carbon dioxide under a pressure of 1 to 700 atmospheres to saturate a 2 molar to saturated solution of sodium chlorate in aqueous ammonium carbonate at −2° C. to 40° C. wherein the molar ratio of ammonium carbonate and sodium chlorate=1:2.

Method 3: Ammonium chlorate is made by introducing ammonia and carbon dioxide at equimolar rates into a 2 molar to saturated solution of sodium chlorate solution at −2° C. to 40° C. until the final molar ratio of ammonia, carbon dioxide and sodium chlorate in the reaction mixture= 1:1:1.

Method 4: Ammonium chlorate is made by absorbing vaporized ammonium bicarbonate in a 2 molar to saturated solution of sodium chlorate at −2° C. to 40° C. until the final molar ratio of ammonia, carbon dioxide and sodium chlorate in the reaction mixture=1:1:1.

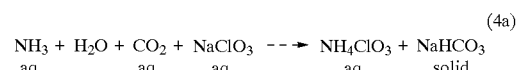
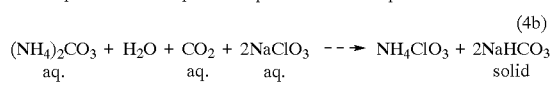

As shown above, the instant invention provides a simple and less expensive method of producing non-alkali metal chlorates. The method also offers the advantages of faster generation of ammonium chlorate due to fast saturation of reaction mixture with carbon dioxide under high pressures.

Having described the invention with reference to particular compositions, theories of effectiveness, and the like, it will be apparent to those of skill in the art that it is not intended that the invention be limited by such illustrative embodiments or mechanisms, and that modifications can be made without departing from the scope or spirit of the invention, as defined by the appended claims. It is intended that all such obvious modifications and variations be included within the scope of the present invention as defined in the appended claims. The claims are meant to cover the claimed components and steps in any sequence which is effective to meet the objectives there intended, unless the context specifically indicates to the contrary.

We claim:

1. A method of making non-alkali metal chlorate comprising:

reacting a non-alkali metal salt with sodium bicarbonate or sodium carbonate to form an insoluble metal carbonate or metal hydroxide precipitate, wherein the non-alkali metal salt is selected from the group consisting of a metal carbonate, a metal hydroxide, and salts of metals which are more soluble than their corresponding carbonates and hydroxides; and combining the insoluble carbonate or the precipitate with an aqueous solution of ammonium chloride to form the non-alkali metal chlorate.

2. A method according to claim 1 wherein the non-alkali metal salt is barium carbonate.

3. A method according to claim 1 wherein non-alkali the metal salt is selected from the group consisting of:

a) sulfates of calcium, strontium, copper, silver, cobalt, nickel, iron, manganese, and rare earth metals and;

b) chlorides of barium, calcium, strontium, copper, silver, cobalt, nickel, iron, manganese, and rare earth metals.

4. A method according to claim 1 wherein the reacting step is performed at a temperature of between 35–105° C.

5. A method according to claim 4 wherein the reacting step is performed at a temperature of between 35–95° C.

6. A method according to claim 1 wherein the molar ratio of non-alkali metal salt to sodium bicarbonate is in the range of from 1:1 to 1:3.

7. A method according to claim 1 wherein the combining step is performed at a temperature in the range of 35–105° C.

8. A method according to claim 1 wherein the combining step is performed in the presence of carbon dioxide.

9. A method according to claim 1 wherein the ammonium chlorate is formed by a method comprising:

mixing carbon dioxide, ammonia, and sodium chlorate with an aqueous solution to form a sodium bicarbonate precipitate and aqueous ammonium chlorate; and removing the sodium bicarbonate precipitate.

10. A method according to claim 9 wherein the mixing step is performed at a temperature of between about −2° C. to 45° C.

11. A method according to claim 9 wherein the steps are performed in a flow reactor or in a batch reactor.

12. A method according to claim 9 wherein the concentration of sodium chlorate is from 2M to saturation and the molar ratio of sodium chlorate, ammonia and carbon dioxide in the mixing step is about 1:1:1.

13. A method according to claim 9 wherein carbon dioxide under pressures of from 1–700 atmospheres is added in the mixing step.

14. A method according to claim 9 wherein the ammonia and carbon dioxide are added at equimolar rates into a 2 molar to saturated solution of sodium chloride.

15. A method according to claim 1 wherein ammonium chlorate is made by absorbing the vapors of ammonium bicarbonate in a 2 molar to saturated solution of sodium chlorate.

* * * * *

UNITED STATES PATENT AND TRADEMARK OFFICE
CERTIFICATE OF CORRECTION

PATENT NO    :   5,948,380
DATED        :   September 7, 1999
INVENTOR(S)  :   M. Fazlul Hoq and Mohammed N.I. Khan It is certified that error appears in the above—identified patent and that said Letters Patent is hereby corrected as shown below:

In the drawings, Sheet 1, Fig. 1, the arrow going from "Aqueous Solution of Sodium Salt" to the box labeled "Reactor #3" should instead go in the opposite direction, from "Reactor #3" to "Aqueous Solution of Sodium Salt".

Column 5, line 19, "1A and 1B" should read --4a and 4b (shown in Example 3)--.

Column 5, lines 62-63, formula (4b), that portion of the formula reading
$NH_4ClO_3$    should read    $2NH_4ClO_3$
                                  aq, Signed and Sealed this Fifth Day of September, 2000

Attest:

Q. TODD DICKINSON

*Attesting Officer*                *Director of Patents and Trademarks*